US010911927B1

(12) United States Patent
Pai et al.

(10) Patent No.: US 10,911,927 B1
(45) Date of Patent: Feb. 2, 2021

(54) METHODS AND APPARATUS FOR SUPPORTING MULTIPLE EMERGENCY CALLERS IN A PUSH-TO-TALK GROUP CALL

(71) Applicant: Motorola Solutions, Inc., Chicago, IL (US)

(72) Inventors: Madhusudan Pai, Frisco, TX (US); Daniel J. McDonald, Cary, IL (US); David Bar-On, Rehovot (IL); Shibu Narendranathan, Allen, TX (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/831,278

(22) Filed: Mar. 26, 2020

(51) Int. Cl.
*H04M 11/04* (2006.01)
*H04W 4/90* (2018.01)
*H04W 4/10* (2009.01)
*H04W 68/00* (2009.01)
*H04W 84/08* (2009.01)
*H04W 4/08* (2009.01)

(52) U.S. Cl.
CPC ............. *H04W 4/90* (2018.02); *H04W 4/08* (2013.01); *H04W 4/10* (2013.01); *H04W 68/005* (2013.01); *H04W 84/08* (2013.01)

(58) Field of Classification Search
CPC .......... H04W 4/90; H04W 4/10; H04W 4/08; H04W 68/00; H04W 68/005; H04W 68/025; H04W 84/08; H04W 76/45; H04W 76/50
USPC ...................................................... 455/404.1
See application file for complete search history.

(56) References Cited

U.S. PATENT DOCUMENTS

| 9,031,598 B2* | 5/2015 | Pai ..................... H04M 3/42374 455/519 |
| 10,142,808 B2 | 11/2018 | Dong et al. |
| 2002/0097746 A1* | 7/2002 | McDonald ............ H04L 12/185 370/468 |
| 2016/0227384 A1* | 8/2016 | Mazzarella ........... H04W 12/08 |

(Continued)

OTHER PUBLICATIONS

Technical Report—3GPP TR 23.790 v15.0.0 (Jan. 2018): Technical Specification Group Services and System Aspects; Study on application architecture for the Future Railway, Mobile Communication System (FRMCS); Stage 2 (Release 15).

*Primary Examiner* — Huy C Ho
(74) *Attorney, Agent, or Firm* — Baker Botts L.L.P.

(57) ABSTRACT

Methods and apparatus for supporting multiple emergency users in a push-to-talk group. The methods include receiving a first emergency alert from a first user device in the push-to-talk group; receiving a second emergency alert from a second user device in the push-to-talk group; causing the first emergency alert and second emergency alert to be provided to each of the console devices in the push-to-talk group; receiving, from the first user device, a first communication and receiving, from the second user device, a second communication; causing the first communication and the second communication to each of the console devices in the push-to-talk group. The methods further include receiving, from a first console device, a selection of one of the first user device and the first emergency alert; and, in response subsequently selectively routing a third communication from the first user device to the first console device and not to a second console device in the push-to-talk group.

20 Claims, 7 Drawing Sheets

(56) References Cited

U.S. PATENT DOCUMENTS

2016/0269876 A1* 9/2016 Senese .................. H04W 4/10
2018/0249302 A1   8/2018 Pai et al.

* cited by examiner

METHODS AND APPARATUS FOR SUPPORTING MULTIPLE EMERGENCY CALLERS IN A PUSH-TO-TALK GROUP CALL

BACKGROUND OF THE INVENTION

The present invention relates to supporting multiple emergency callers in a push-to-talk group call. In the case of an emergency, a push-to-talk radio user can choose to put the push-to-talk radio in emergency mode. When the push-to-talk radio enters emergency mode, the radio sends an emergency alert signal that arrives at console devices to notify dispatchers at those console devices that the radio user is in an emergency situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
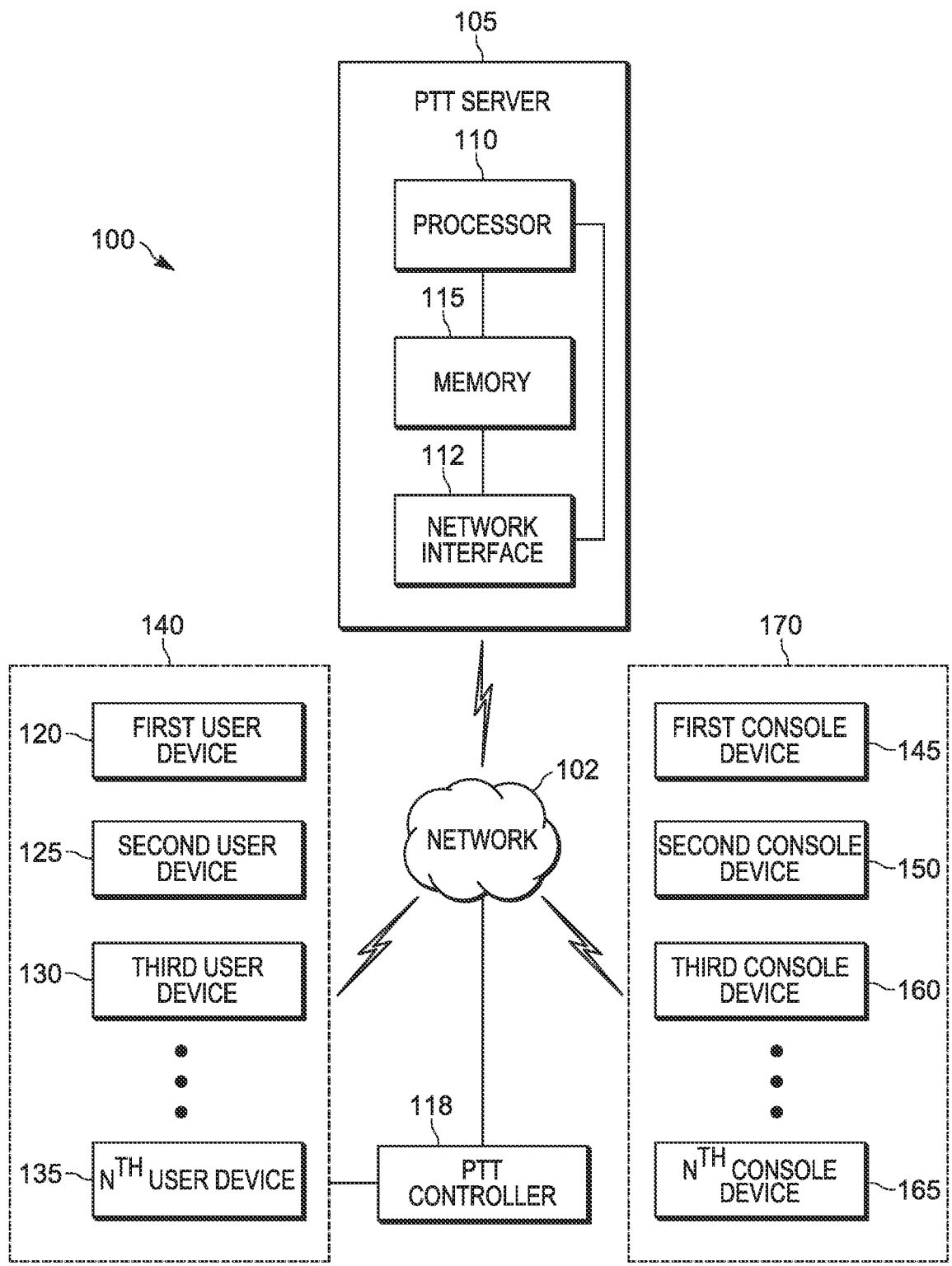
FIG. 1 is an illustration of an example electronic communication system with a push-to-talk server, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by suitable symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Disclosed herein are systems, methods, apparatus, and non-transitory, computer-readable storage media for supporting multiple emergency callers in a push-to-talk group call.

There exists a limitation when there are multiple push-to-talk radio users in an emergency mode on the same push-to-talk group call. In land mobile radio (LMR) systems, there is a two-step process for an emergency caller to establish communication with a dispatcher at a console device. When a push-to-talk radio user invokes an emergency button on the push-to-talk radio, the push-to-talk radio will send an emergency alert to one or more console devices. The purpose of the emergency alert is to alert the dispatcher(s) at one or more console devices that the push-to-talk radio user is experiencing an emergency situation. After the emergency alert has been sent, the push-to-talk radio user can invoke a push-to-talk button on the push-to-talk radio to initiate an emergency call.

In land mobile radio (LMR) systems, the "last-in" emergency call from a push-to-talk radio user interrupts any user's communication in the push-to-talk call group, including any existing emergency communication, with a console device. In this case, the emergency call from another push-to-talk radio user that was previously communicating with a console device is interrupted when a second push-to-talk radio enters an emergency mode and the user of the second push-to-talk radio initiates an emergency call.

In some broadband systems, the "last-in" emergency call from a push-to-talk device user request is queued. In this case, the emergency user that is communicating with a console device is not interrupted when a second emergency caller enters an emergency mode and initiates an emergency call. Instead, the second emergency caller is granted the floor, also referred to as being connected to a console device, only after existing emergency users' communication with the console device has concluded.

Accordingly, an improved apparatus and method for supporting multiple emergency callers communicating concurrently in a push-to talk group call is needed.

In one embodiment, a push-to-talk server for handling multiple emergency alerts in a push-to-talk group, wherein the push-to-talk group includes a plurality of user devices and a plurality of console devices in a push-to-talk group, the push-to-talk server includes a memory and a processor. The processor is coupled to the memory. The processor may be configured to receive a first emergency alert from a first user device in the push-to-talk group. The processor may be further configured to receive a second emergency alert from a second user device in the push-to-talk group. The processor may also be configured to cause the first emergency alert and second emergency alert to be provided to each of the console devices. The processor may be configured to receive, from the first user device, a first communication and to receive, from the second user device, a second communication. The processor may be further configured to cause the first communication and the second communication to be provided to each of the console devices in the push-to-talk group. The processor may be configured to receive, from a first console device, a selection of one of the first user device and the first emergency alert; and, in response: subsequently selectively route a third communication from the first user device to the first console device and not to a second console device in the push-to-talk group.

In one embodiment, a method for handling multiple emergency alerts in a push-to-talk group, wherein the push-to-talk group includes a plurality of user devices and a plurality of console devices in a push-to-talk group, includes receiving a first emergency alert from a first user device in the push-to-talk group. The method further includes receiving a second emergency alert from a second user device in the push-to-talk group. In addition, the method includes causing the first emergency alert and second emergency alert to be provided to each of the console devices in the push-to-talk group. The method also includes receiving, from the first user device, a first communication and receiving, from the second user device, a second communication. The method further includes causing the first communication and the second communication to each of the console devices in the push-to-talk group. The method includes receiving, from a first console device, a selection of one of the first user device and the first emergency alert; and, in response subsequently selectively routing a third communication from the first user device to the first console device and not to a second console device in the push-to-talk group.

In at least some embodiments of the present disclosure, the systems and methods described herein for handling multiple emergency alerts in a push-to-talk group may include receiving, from the first console device, a determination that the third communication from the first user device should be provided to all user devices and all console devices in the push-to-talk group; and, in response to said determination, causing the third communication from the first user device to be provided to all user devices and all console devices in the push-to-talk group.

In another embodiment of the present disclosure, the systems and methods described herein for handling multiple emergency alerts in a push-to-talk group may include receiving, from the first console device, a determination that the third communication from the first user device should not be provided to all user devices and all console devices in the push-to-talk group. The systems and methods may also include receiving, from the first console device, a response to the first user; and causing the response to be provided to the first user.

In at least some embodiments of the present disclosure, the systems and methods described herein for handling multiple emergency alerts in a push-to-talk group may include receiving, from the first console device, a determination that the third communication from the first user device should not be provided to all user devices and all console devices in the push-to-talk group. The systems and methods may also include receiving, from the first console device, a response to the first user; and causing the response to be provided to the first user.

In at least some embodiments of the present disclosure, the systems and methods described herein for handling multiple emergency alerts in a push-to-talk group may include receiving, from the first console device, a selection of one of the second user device and the second emergency alert; and, in response subsequently selectively route a fourth communication from the second user device to the first console device and not to the second console device in the push-to-talk group.

In at least some embodiments of the present disclosure, the systems and methods described herein for handling multiple emergency alerts in a push-to-talk group may include receiving, from the second console device of the plurality of console devices, a selection of one of the second user device and the second emergency alert; and, in response subsequently selectively route a fourth communication from the second user device to the second console device and not to the first console device in the push-to-talk group. The systems and methods may optionally include receiving, from the second console device, a determination that the fourth communication from the second user device should not be provided to all user devices and all console devices in the push-to-talk group. The systems and method may also include receiving, from the second console device, a response to the second user causing the response to be provided to the second user.

In at least some embodiments of the present disclosure, the systems and methods described herein for handling multiple emergency alerts in a push-to-talk group may include receiving from the first console device, a determination that the third communication from the first user device should be provided to all user devices and all console devices in the push-to-talk group. The systems and methods may optionally include receiving, from the second console device, a determination that the fourth communication from the second user device should be provided to all user devices and all console devices in the push-to-talk group. The systems and methods may optionally include causing the third communication from the first user device and the fourth communication from the second user device to be provided to all user devices and all console devices in the push-to-talk group.

In at least some embodiments of the present disclosure, the first emergency alert is an indication that first user device is in an emergency mode and the second emergency alert is an indication that the second user device is in an emergency mode.

In one embodiment, the first communication and the second communication include audio. In another embodiment, the first communication and the second communication include video.

In yet another embodiment, the first communication and the second communication include a combination of audio and video.

In at least some embodiments, the first communication and the second communication include data.

Referring now to FIG. 1, there is provided an illustration of an example electronic communication system with a push-to-talk server, in accordance with some embodiments. Electronic communication system 100 may include a network 102, a push-to-talk (PTT) server 105, a group of user devices 140, and a group of console devices 170. The components of the system 100 are communicatively coupled via the network 102. The network 102 may be a communications network including wireless and wired connections. The network 102 may include one or more networks using one or more protocols including, but not limited to, a broadband network, a land mobile radio (LMR) network, and a cellular network (for example, a Long Term Evolution (LTE) network). However, the concepts and techniques embodied and described herein may be used with networks using other protocols, for example, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3GSM networks, 4GSM networks, and other suitable networks, including future-developed network architectures. The push-to-talk (PTT) server 105, the group of user devices 140 (comprising user devices 120, 125, 130, and 135), and the group of console devices 170 (comprising console devices 145, 150, 160, and 165) may communicate with each other over the network 102 using suitable wired and wireless communications protocols. In some embodiments, communications with other external devices (not shown) may occur over the network 102.

In conventional land mobile radio (LMR) operation, an individual radio connects to a land mobile radio network via a radio frequency site. A typical land mobile radio network may include many radio frequency sites and a zone controller that directs radio call traffic to each radio frequency site. The zone controller sends call grant notifications for active radio calls to the radio frequency sites, which each in turn broadcast the call grant notifications over a broadcast control channel to land mobile radios. In trunked land mobile radio networks, for example, each call grant notification is typically associated with a group of land mobile radios, also called a talk group, for which there is an active radio call.

Land mobile radios may be connected over different types of land mobile radio networks. For example, a trunked land mobile radio network may be implemented as a packet switching computer network with a zone controller acting as a centralized processor for traffic over the trunked land mobile radio network. Trunking allows the land mobile radio network to share a limited number of communication channels among many users utilizing talk groups. The zone controller may use a broadcast control channel at each frequency site to communicate with user devices, and the remaining channels may be used for communications between the user devices associated with various talk groups. Typically, the control channel is used to broadcast available call grants to all of the user devices connected to a radio frequency site of the land mobile radio network.

Push-to-talk server 105 may include hardware and software that allow the user devices 120, 125, 130, and 135 (collectively, a group of user devices 140) and the console devices 145, 150, 160, and 165 (collectively, a group of console devices 170) to communicate through the network 102 via a wired connection, a wireless connection, or a combination of both wired and wireless connections. In various embodiments, push-to-talk server 105 may be implemented as a group communication service application server (GCS-AS), such as a Push-to-Talk (PTT) controller 118, which may be included in the application level of communication system 100, which may also be referred to as the application domain.

Push-to-talk server 105 may be implemented with a processor 110 that may be coupled to a memory 115 and network interface 112. Memory 115 may store instructions which when executed by processor 110 provide for push-to-talk server 105 operation in system 100. Network interface 112 may include one or more network devices coupled to one or more elements of system 100. Although a single processor 110 and memory 115 are shown, processor 110 may include one or more local or distributed processors and memory 115 may include one or more types of memories and one or more local or distributed memory modules.

Although a single push-to-talk server 105 is shown, push-to-talk server 105 may include one or more local or distributed servers.

User devices 120, 125, 130, and 135 (collectively, a group of user devices 140) are wireless and/or wired communication devices that includes hardware and software that enable it to communicate via the network 102. Each of the user devices in the group of user devices 140 include push-to-talk capability. The group of user devices 140 can include any number of user devices. As one example, such user devices may be deployed to in-field public safety officers (e.g., those officers deployed to patrol an area or respond to an incident) to aid in a group response or to further aid to a single officer, among other possibilities.

User devices 120, 125, 130, and 135 may have a similar structure to that of the PTT server 105 described in FIG. 1. User devices 120, 125, 130, and 135 may further include one or more additional user input interfaces (such as a button, microphone, touch screen, etc.) and one or more user output interfaces (such as a display, speaker, etc.).

Each user device 120, 125, 130, and 135 having the push-to-talk capability may be subscribed to a push-to-talk service such that the user equipment may be a member of or may be affiliated with at least one talk group. For push-to-talk service, uplink bearers are unicast (e.g., only one member is generally granted the floor to transmit or speak at a time) and downlink bearers may be unicast, Enhanced Multimedia Broadcast Multicast Service (eMBMS) broadcast, MBMS multicast, or some combination thereof (e.g., multiple targets are able to receive or listen at a time), depending on the network and user equipment capabilities. Additionally, or alternatively, push-to-talk service may be achieved via a conventional or trunked land mobile radio (LMR) system.

Console devices 145, 150, 160, and 165 (collectively, a group of console devices 170) may be wireless communication devices that includes hardware and software that enable it to communicate via the network 102. The group of console devices 170 may include any number of console devices. In one embodiment, console devices 145, 150, 160, and 165 may be software applications installed on one or more computer devices.

Each of console devices 145, 150, 160, and 165 may be configured to operate in connection with any or all of user devices 120, 125, 130, and 135. In particular, console devices 145, 150, 160, and 165 may be configured to enable voice dispatch, texting, job ticketing, and event logging. Console devices 145, 150, 160, and 165 may further be configured to enable GPS tracking of user devices and voice recording of communications in a push-to-talk group call. As one example, such console devices may be deployed at a public safety answering point (PSAP) where dispatchers supporting a particular agency (police or fire) or jurisdiction (city or county) may coordinate with each other and with in-field officers, among other possibilities.

Console devices 145, 150, 160, and 165 may be configured to receive communications from one or more user devices, such as one or more of user devices 120, 125, 130, and 135.

Console devices 145, 150, 160, and 165 may have a similar structure to that of the PTT server 105 described in FIG. 1. Console devices 145, 150, 160, and 165 may further include one or more additional user input interfaces (such as a mouse, keyboard, microphone, touch screen, etc.) and one or more user output interfaces (such as a display, speaker, etc.).

Figure 2:
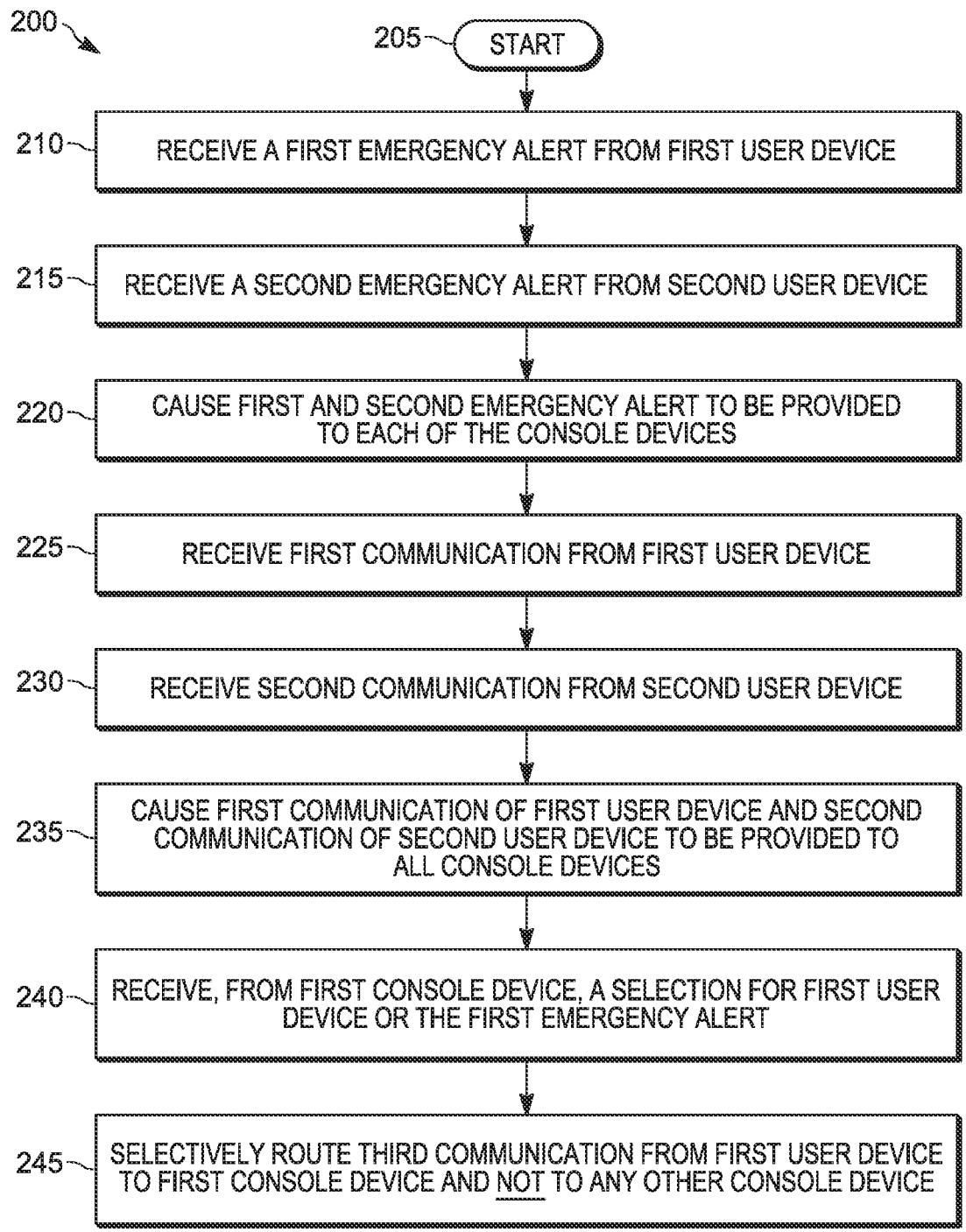
FIG. 2 is a flow diagram of a push-to-talk group call with multiple emergency alerts, in accordance with some embodiments.

Referring now to FIG. 2, there is provided a call flow diagram of a push-to-talk group call, in accordance with some embodiments. In this example embodiment, method 200 begins at block 205 in FIG. 2 and continues at block 210 with receiving a first emergency alert from a first user device, such as user device 120 as described for FIG. 1. The first emergency alert may be received by the PTT server, such as PTT server 105 as described for FIG. 1.

In one embodiment, the first emergency alert from the user of the first user device 120 may be received by the PTT server 105 when the user of the first user device 120 invokes an emergency button on the first user device 120. The emergency button may be a mechanical button and/or a soft button on a graphical user interface on a screen (not shown) on the first user device 120.

In another embodiment, the first emergency alert from the user of the first user device 120 may be received by the PTT server 105 when the user of the first user device 120 initiates a push-to-talk call with emergency priority. Initiating a push-to-talk call with emergency priority ensures that the push-to-talk call gets the required resources such that the call is connected to one or more of the console devices, regardless of the system load at that time. Resources may be radio frequency (RF) channels in a conventional or trunked land mobile radio (LMR) system. When all available radio frequency (RF) channels are in use by other callers and an emergency alert is received, PTT server 105 may reallocate an active RF channel, also referred to as an RF channel that is in use by a non-emergency mode push-to-talk device user, to the push-to-talk user device that initiated a call with emergency priority. Other examples of resources may include broadband LTE resources, such as eMBMS resources or unicast resources.

Method 200 continues at block 215 with the PTT server 105 receiving a second emergency alert from a second user device, such as user device 125. The second emergency alert from the second user device 125 may be sent to PTT server 105 in any of the ways described with respect to the first emergency alert of the first user device 120.

Method 200 continues at block 220 where the first and second emergency alerts are provided to each of console devices in the group of console devices 170. As described above, the group of console devices may include any number of console devices. In one example, the group of console devices 170 includes four console devices: console device 145, console device 150, console device 160, and console device 165. In this example, the first and second emergency alerts are provided to each of console devices 145, 150, 160, and 165. In one embodiment, the first emergency alert and the second emergency alert are provided by PTT server 105 via network 102.

When the first emergency alert and the second emergency alert are received by each of console devices 145, 150, 160, and 165 in the group of consoles 170, each of the console devices may provide an audio indication, a visual indication, or an audio and visual indication that the first user device and the second user device are in an emergency mode. An audio indication may be, for example, a siren or alarm. A visual indication may be, for example, a blinking light or a change in color of the graphical user interface on a screen of the console device (not shown). For example, each of console devices 145, 150, 160, and 165 in the group of console devices 170 may show a blinking light associated with the first user device and the second user device. In addition, each of console devices 145, 150, 160, and 165 in the group of console devices 170 may produce an audio alarm associated with the first user device and the second user device. An audio alarm may be associated with a specific user device where each user device has a different audio tone that plays when that user device enters an emergency mode.

Method 200 continues at block 225, with PTT server 105 receiving a first communication of the first user device 120. The first communication of the first user device 120 may include audio, video, and/or data. Such data can include location information of the user device, an operational status of the user device, messages, pictures, and/or file attachments. Further, the first communication of the first user device 120 may include a combination of audio and video.

In one example, the first communication of the first user device may include an audio signal from the user of the first user device 120. Alternatively, the first communication of the first user device may include a video signal from the user of the first user device 120. In addition, the first communication of the first user device 120 may include both audio and video signals from the user of the first user device 120.

Method 200 continues at block 230 with PTT server 105 receiving a second communication of the second user device 125. The second communication of the second user device 125 may include audio or video data. Alternatively, the second communication of the second user device 125 may include both audio and video data.

Method 200 continues in block 235 with PTT server 105 causing the first communication of the first user device 120 and the second communication of the second communication device 125 are provided to each of console devices 145, 150, 160, and 165 in the group of console devices 170. In one embodiment, the first communication of the first user device 120 and the second communication of the second user device 125 are provided by PTT server 105 via network 102.

Method 200 continues in block 240 with PTT server 105 receiving, from a first console device (such as console device 145) a selection for the first user device 120 or the first emergency alert. In one embodiment, console device 145 may select or acknowledge the first user device 120 or the first emergency alert by a dispatcher selecting the first user device from the graphical user interface on a screen (not shown) of the console device 145.

Finally, method 200 continues in block 245 with PTT server 105 selectively routing a third communication of the first user device 120 to the first console device, e.g. console device 145, and not to any of the other console device 150, 160, or 165 of the group of consoles 170. PTT server 105 may selectively route communications to a specific device in a number of ways. In one embodiment, PTT server 105 may specify the IP address and port of the console device that selected the user device or emergency alert. PTT server 105 may selectively route the third communication of the first user device 120 by specifying the IP address of console device 145 which selected user device 120 or the first emergency alert. Alternatively, PTT server 105 may selectively route communications to a specific console device by specifying a radio channel or a radio identifier associated with the console device. PTT server 105 may selectively route the third communication of the first user device 120 by specifying the radio channel or a radio identifier associated with console device 145 which selected user device 120 or the first emergency alert.

In the embodiment shown in FIG. 2, unless a console device selects the second user device or the second emergency alert, any future communications from the second user device will continue to be provided to each of console devices 145, 150, 160, and 165 of the group of console devices 170.

Figure 3A:
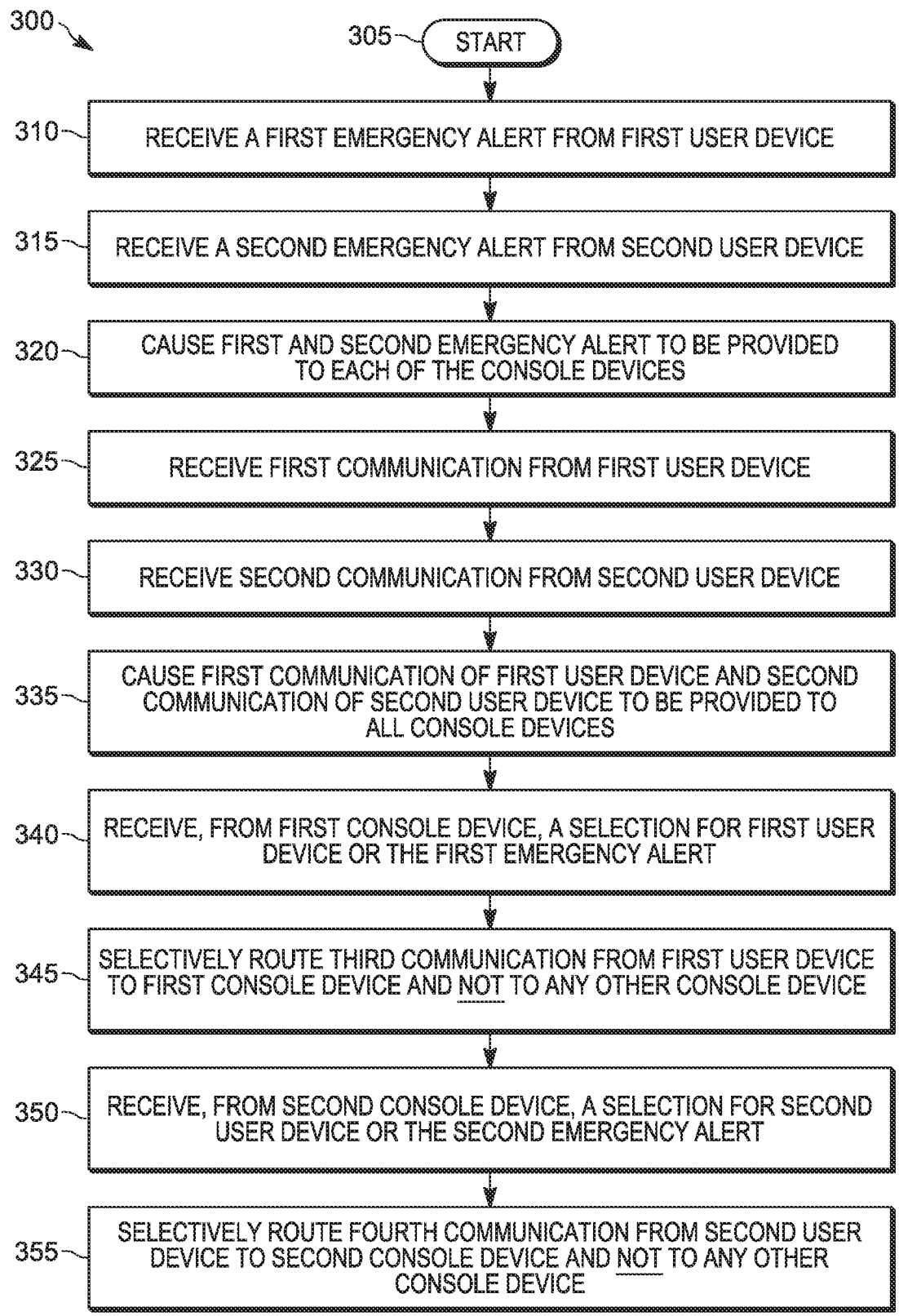
FIG. 3A is a flow diagram of a push-to-talk group call in which each console device selects an emergency user device or an emergency alert, in accordance with some embodiments.

Referring now to FIG. 3A, there is provided a flow diagram of a push-to-talk group call in which each console device selects an emergency user or an emergency alert, in accordance with some embodiments of the present disclosure. In this example embodiment, method 300 begins at block 305. Block 310 may be implemented in a similar manner as described for block 210 of FIG. 2. Block 315 may be implemented in a similar manner as described for block 215 of FIG. 2. Block 320 may be implemented in a similar manner as described for block 220 of FIG. 2. Block 325 may be implemented in a similar manner as described for block 225 of FIG. 2. Block 330 may be implemented in a similar manner as described for block 230 of FIG. 2. Block 335 may be implemented in a similar manner as described for block 235 of FIG. 2. Block 340 may be implemented in a similar manner as described for block 240 of FIG. 2. Block 345 may be implemented in a similar manner as described for block 245 of FIG. 2.

After block 345, method 300 may continue in block 350 with PTT server 105 receiving, from the second console device, e.g. console device 150, a selection for the second user device, e.g., user device 125, or the second emergency alert. Console device 150 may select or acknowledge the second user device 125 or the second emergency alert by selecting the second user device from the graphical user interface on a screen (not shown) of the console device 150.

At block 355, PTT server 105 selectively routes a fourth communication of the second user device 125 to the second console device, e.g. console device 150, and not to any of the other console devices 145, 160, or 165 of the group of console devices 170. PTT server 105 may selectively route communications to a specific device in a number of ways. In one embodiment, PTT server 105 may specify the IP address of the console device that selected the user device or emergency alert. In reference to FIG. 3A, PTT server 105 may selectively route the fourth communication of the second user device 125 by specifying the IP address and port of console device 150 which selected user device 125 or the second emergency alert. Alternatively, PTT server 105 may selectively route communications to a specific console device by specifying a radio channel or a radio identifier associated with the console device. PTT server 105 may selectively route the fourth communication of the second user device 125 by specifying the radio channel or a radio identifier associated with console device 150 which selected user device 125 or the second emergency alert.

In the embodiment shown in FIG. 3A, the first console device 145 has selected the first user device 120 (or the first emergency alert) and the second console device 150 has selected the second user device 125 (or the second emergency alert). Accordingly, the first console device 145 will receive future communications from the first user device 120. Future communications from the first user device 120 will not be provided to the other console devices of the console device group 170, e.g., to console devices 150, 160, and 165. The second console device 150 will receive future communications from the second user device 125. Future communications from the second user device 125 will not be provided to the other console devices of the console device group 170, e.g., to console devices 145, 160, and 165.

Figure 3B:
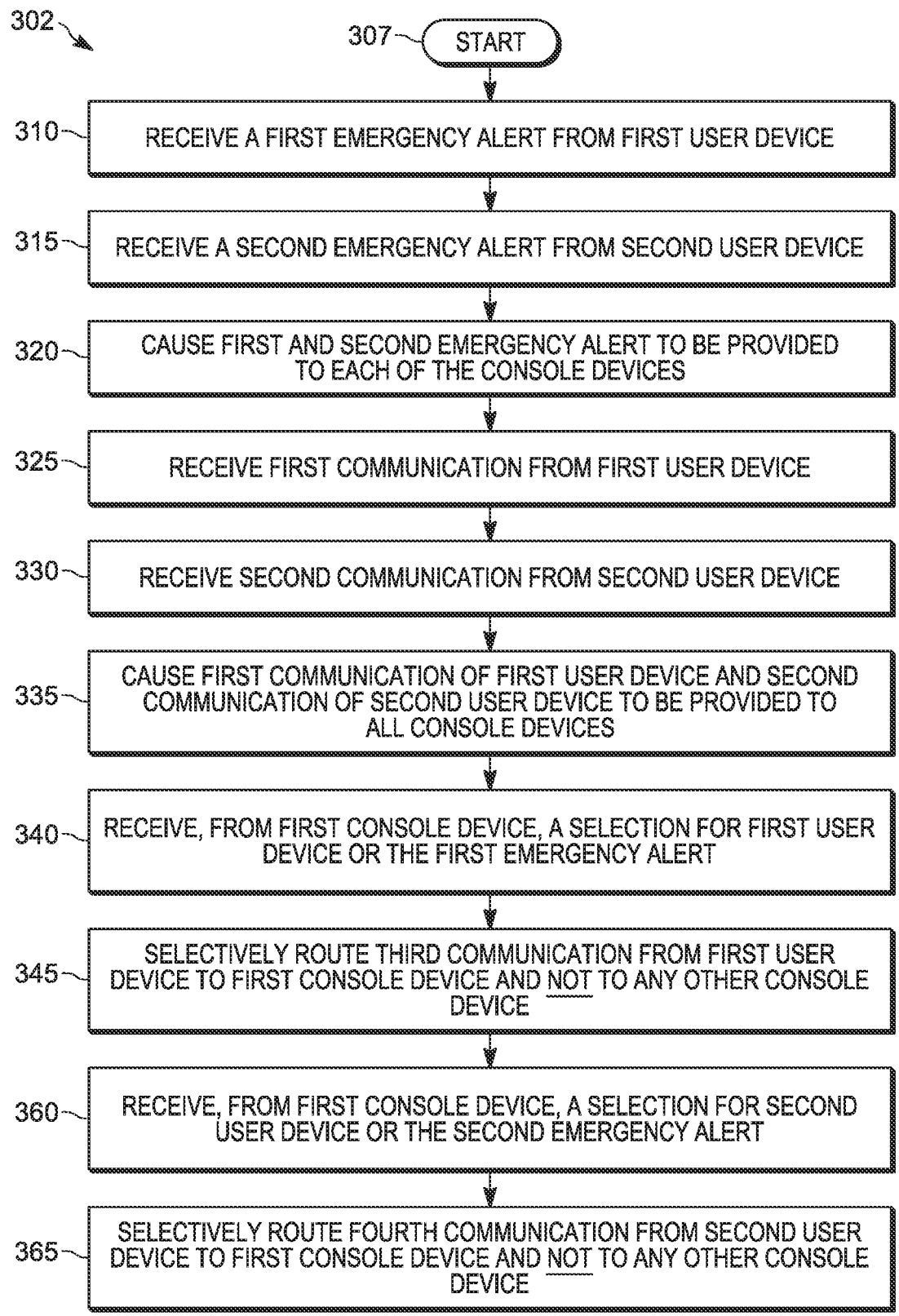
FIG. 3B is a flow diagram of a push-to-talk group call in which one console device selects more than one emergency user devices or emergency alerts, in accordance with some embodiments.

Referring now to FIG. 3B, there is provided a flow diagram of a push-to-talk group call in which one console device selects more than one emergency users or emergency alerts, in accordance with some embodiments of the present disclosure. In this example embodiment, method 302 begins at block 307. Block 310 may be implemented in a similar manner as described for block 210 of FIG. 2. Block 315 may be implemented in a similar manner as described for block 215 of FIG. 2. Block 320 may be implemented in a similar manner as described for block 220 of FIG. 2. Block 325 may be implemented in a similar manner as described for block 225 of FIG. 2. Block 330 may be implemented in a similar manner as described for block 230 of FIG. 2. Block 335 may be implemented in a similar manner as described for block 235 of FIG. 2. Block 330 may be implemented in a similar manner as described for block 230 of FIG. 2. Block 335 may be implemented in a similar manner as described for block 235 of FIG. 2. Block 340 may be implemented in a similar manner as described for block 240 of FIG. 2. Block 345 may be implemented in a similar manner as described for block 245 of FIG. 2.

After block 345, method 300 may continue in block 360 with PTT server 105 receiving from the first console device 145 a selection for the second user device, e.g., user device 125, or the second emergency alert. Console device 145 may select or acknowledge the second user device 125 or the second emergency alert by selecting the second user device from the graphical user interface on a screen (not shown) of the console device 145.

Method 300 may then continue in block 365 with PTT server 105 selectively routing a fourth communication of the second user device 125 to the first console device, e.g. console device 145, and not to any of the other console devices 150, 160, or 165 of the group of console devices 170. PTT server 105 may selectively route communications to a specific console device in a number of ways. In at least one embodiment, PTT server 105 may specify the IP address of the console device that selected the user device or emergency alert. Thus, PTT server 105 may selectively route the fourth communication of the second user device 125 to console device 145 by specifying the IP address of console device 145. In another embodiment, PTT server 105 may selectively route communications to a specific console device by specifying a radio channel or a radio identifier associated with the console device. Accordingly, PTT server 105 may selectively route the fourth communication of the second user device 125 to console device 145 by specifying the radio channel or a radio identifier associated with console device 145. In another embodiment, PTT server 105 may selectively route communications to a specific console device by specifying a broadband eMBMS resource. Accordingly, PTT server 105 may selectively route the fourth communication of the second user device 125 to console device 145 by specifying the eMBMS broadcast area in which the first console device 145 resides.

In the example embodiment shown in FIG. 3B, the first console device 145 has selected both the first user device 120 (or first emergency alert) and the second user device 125 (or second emergency alert). A console device may select more than one user device (or emergency alert) where, for example, there are more user devices in an emergency mode (or emergency alerts) than there are available console devices. There may be more user devices in an emergency mode that available console devices if, for example, the user of a given console device (for example, the dispatcher) is currently unavailable. Alternatively, there may be more user devices in emergency mode than available console devices when there is a major emergency event, such as a natural disaster or terrorist attack. In this case, the number of user devices in an emergency mode may far outnumber the number of console devices.

Figure 4A:
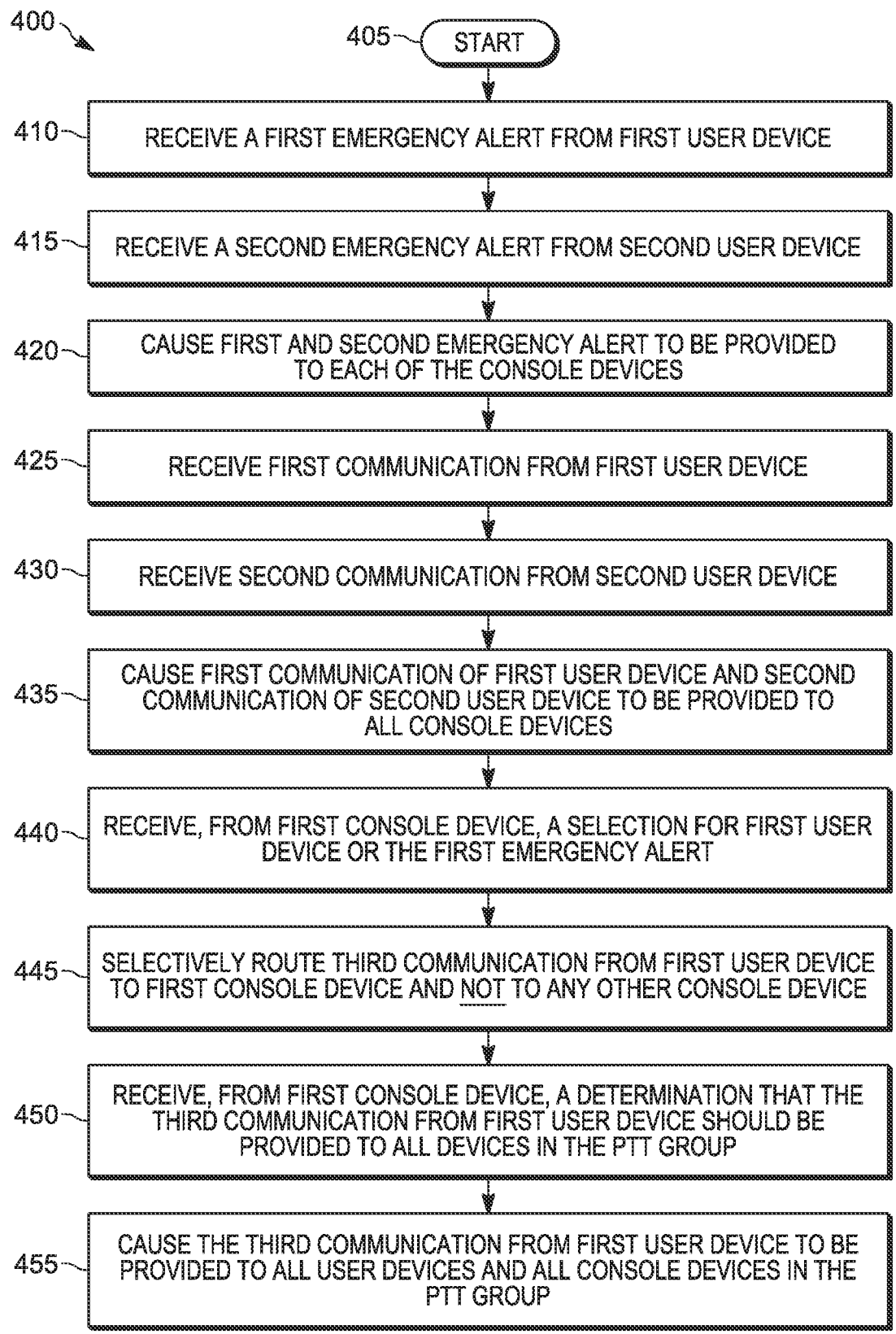
FIG. 4A is a flow diagram of a push-to-talk group call in which a console device determines that an emergency user device's communication should be provided to all devices in the push-to-talk group call, in accordance with some embodiments.

Referring now to FIG. 4A, there is provided a flow diagram of a push-to-talk group call in which a console device determines that an emergency user's communication should be provided to all devices in the push-to-talk group call, in accordance with some embodiments of the present disclosure. In this example embodiment, method 400 begins at block 405. Block 410 may be implemented in a similar manner as described for block 210 of FIG. 2. Block 415 may be implemented in a similar manner as described for block 215 of FIG. 2. Block 420 may be implemented in a similar manner as described for block 220 of FIG. 2. Block 425 may be implemented in a similar manner as described for block 225 of FIG. 2. Block 430 may be implemented in a similar manner as described for block 230 of FIG. 2. Block 435 may be implemented in a similar manner as described for block 235 of FIG. 2. Block 440 may be implemented in a similar manner as described for block 240 of FIG. 2. Block 445 may be implemented in a similar manner as described for block 245 of FIG. 2.

After block 445, method 400 may continue in block 450 with PTT server 105 receiving from the first console device, e.g., console device 145, a determination that the third communication of first user device 120 should be provided to all devices in the push-to-talk group call. The console device 145 may determine that the third communication of the first user device 120 is relevant to other devices in the push-to-talk group call. The dispatcher at console device 145 may interact with the user interface of the console device 145, such as a mouse, keyboard, or touch screen, to indicate that the third communication of first user device 120 should be provided to all devices in the push-to-talk group call. For example, there may be an ongoing manhunt in which the user devices 120, 125, 130, and 135 are operated by law enforcement officers. In this example, the console device 145 may determine that the third communication of the first user device 120 includes a description of a suspect and may therefore be relevant to the other user devices 125, 130, and 135

Method 400 may then continue in block 455 with PTT server 105 causing the third communication of the first user to be provided to (e.g., broadcast, multicast, or multiple unicast) all user devices in the group of user devices 140 and to all console devices in the group of console devices 170. In one embodiment, the console device that selected the first user device 120 or the first emergency alert, such as console device 145, may receive the third communication from the PTT server 105. The console device 145 may then communicate the third communication to each of the user devices in the group of user devices 140 and each of the console devices in the group of console devices 170. In another embodiment, the console device that selected the first user device 120 or the first emergency alert, such as console device 145, may indicate to the server that the third communication should be provided to each of the user devices in the group of user devices 140 and each of the console devices in the group of console devices 170.

Figure 4B:
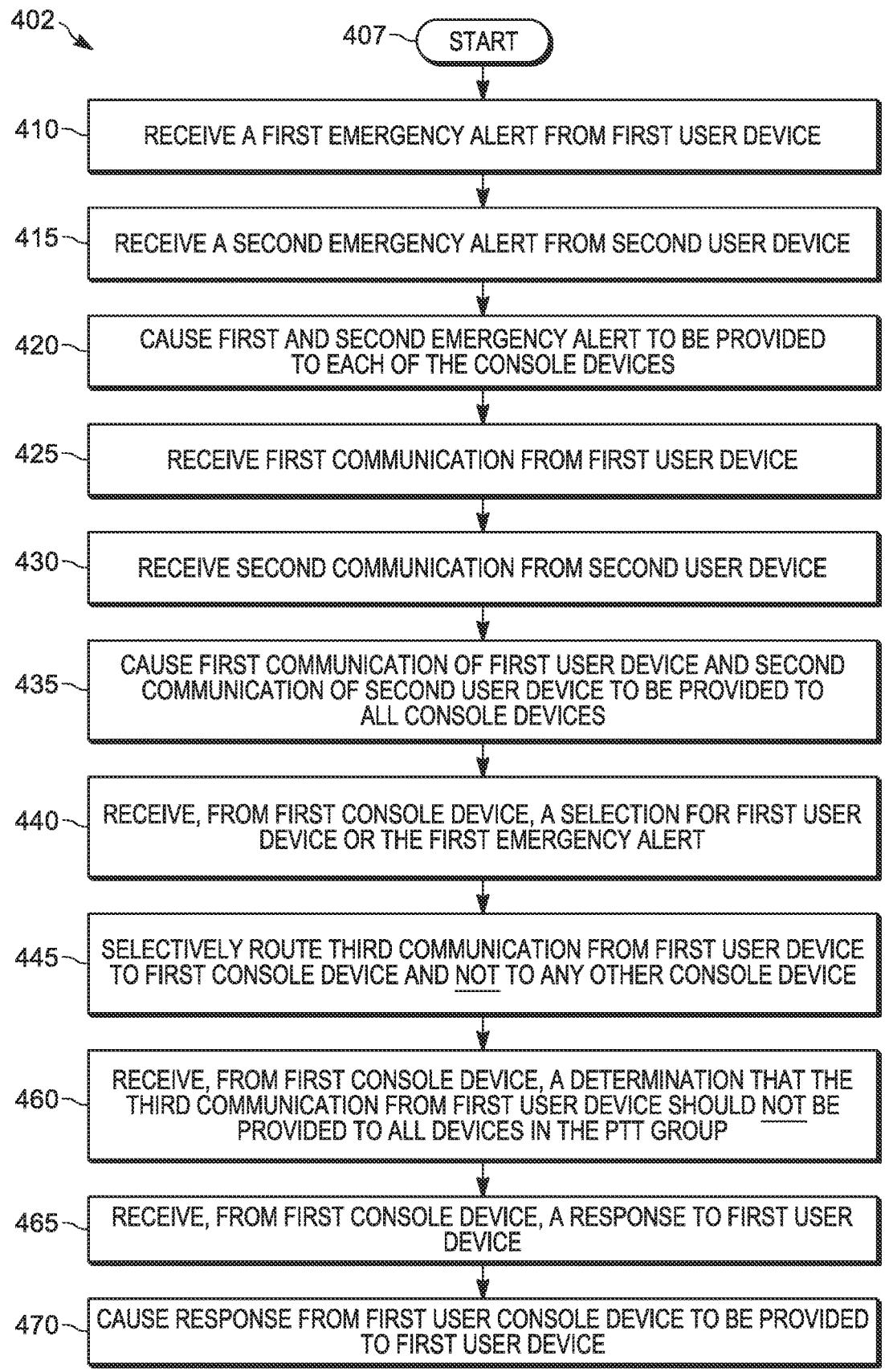
FIG. 4B is a flow diagram of a push-to-talk group call in which a console device determines that an emergency user device's communication should not be provided to all devices in the push-to-talk group call, in accordance with some embodiments.

Referring now to FIG. 4B, there is provided a flow diagram of a push-to-talk group call in which a console device determines that an emergency user's communication should not be provided to all devices in the push-to-talk group call, in accordance with some embodiments of the present disclosure. In this example embodiment, method 402 begins at block 407. Block 410 may be implemented in a similar manner as described for block 210 of FIG. 2. Block 415 may be implemented in a similar manner as described for block 215 of FIG. 2. Block 420 may be implemented in a similar manner as described for block 220 of FIG. 2. Block 425 may be implemented in a similar manner as described for block 225 of FIG. 2. Block 430 may be implemented in a similar manner as described for block 230 of FIG. 2. Block 435 may be implemented in a similar manner as described for block 235 of FIG. 2. Block 440 may be implemented in a similar manner as described for block 240 of FIG. 2. Block 445 may be implemented in a similar manner as described for block 245 of FIG. 2.

After block 445 in FIG. 4B, method 400 may continue in block 460 with PTT server 105 receiving from the first console device, e.g., console device 145, a determination that the third communication of first user device 120 should not be provided to all devices in the push-to-talk group call. The console device 145 may determine that the third communication of the first user device 120 is not relevant or should otherwise not be provided to other devices in the push-to-talk group call. For example, there may be an ongoing manhunt in which the user devices 120, 125, 130, and 135 are operated by law enforcement officers. In this example, the console device 145 may determine that the third communication of the first user device 120 includes a description of a serious injury or death and should therefore not be shared with other devices in the PTT group call.

Method 400 may continue in block 465 with PTT server 105 receiving from the first console device 145 a response to the first user device. The response from the first console device 145 may include audio or video data. Alternatively, the response from the first console device 145 may include both audio and video data.

Method 400 may continue in block 470 with causing the response from the first console device 145 to be provided to only the first user device 120. In one embodiment, the response may be provided by the first console device 145 to the first user device 120 by PTT server 105 via network 102.

Figure 5:
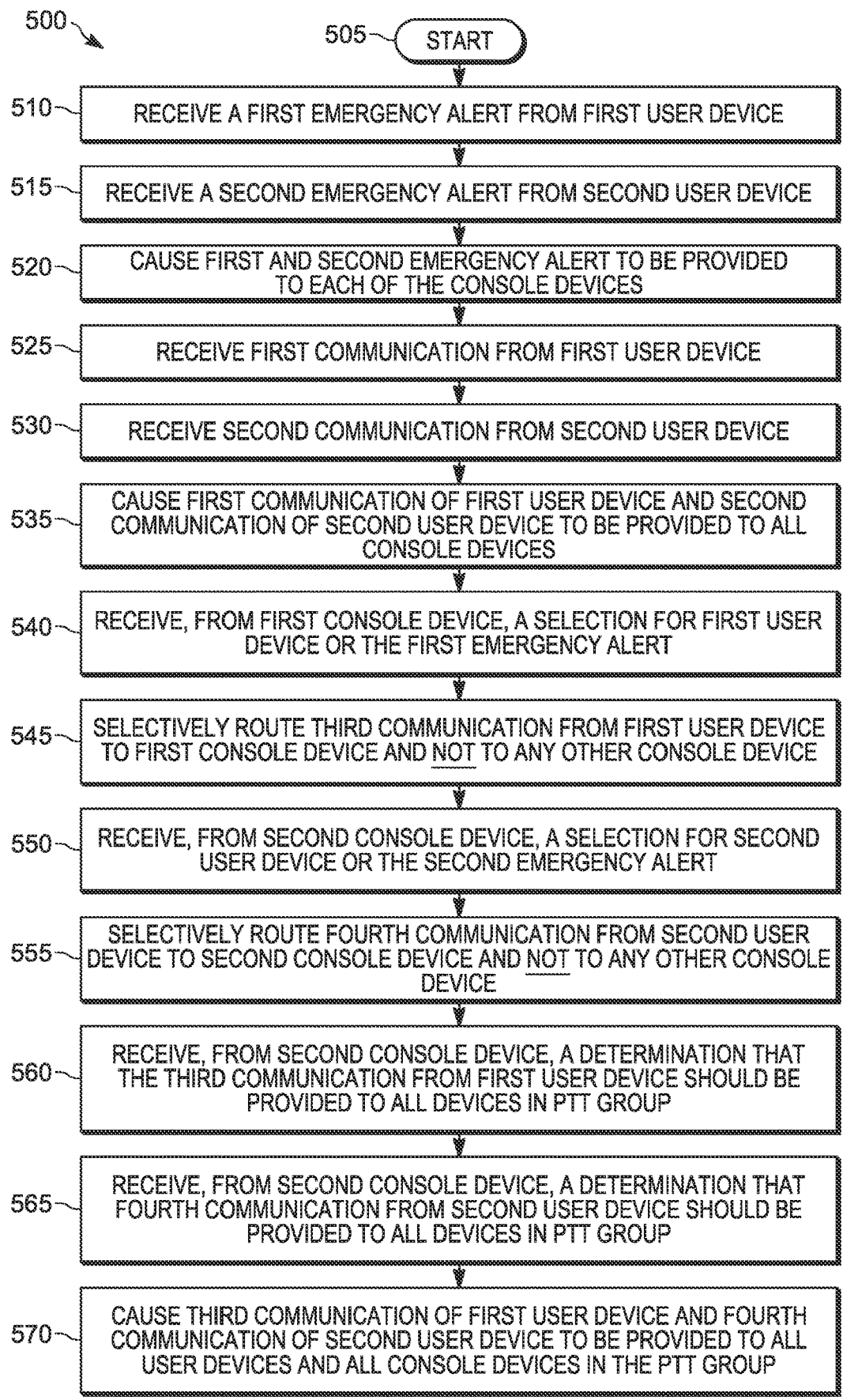
FIG. 5 is a flow diagram of a push-to-talk group call in which two or more emergency user's communications sent to all user devices in the push-to-talk group call, in accordance with some embodiments.

Referring now to FIG. 5, there is provided a flow diagram of a push-to-talk group call in which two or more emergency user's communications are sent to all user devices in the push-to-talk group call, in accordance with some embodiments of the present disclosure. In this example embodiment, method 500 begins at block 505. Block 510 may be implemented in a similar manner as described for block 210 of FIG. 2. Block 515 may be implemented in a similar manner as described for block 215 of FIG. 2. Block 520 may be implemented in a similar manner as described for block 220 of FIG. 2. Block 525 may be implemented in a similar manner as described for block 225 of FIG. 2. Block 530 may be implemented in a similar manner as described for block 230 of FIG. 2. Block 535 may be implemented in a similar manner as described for block 235 of FIG. 2. Block 540 may be implemented in a similar manner as described for block 240 of FIG. 2. Block 545 may be implemented in a similar manner as described for block 245 of FIG. 2. Block 550 may be implemented in a similar manner as described for block 350 of FIG. 3A. Block 555 may be implemented in a similar manner as described for block 355 of FIG. 3A.

Block 560 may be implemented in a similar manner as described for block 450 of FIG. 4A. PTT server 105 may receive, from a first console device (e.g., console device 145) a determination that a third communication from the first user device (e.g., user device 120) should be provided to all device in the PTT group call.

Block 565 may also be implemented in a similar manner as described for block 450 of FIG. 4A. PTT server 105 may receive, from the second console device (e.g., console device 150) a determination that a fourth communication from the second user device (e.g., user device 125) should be provided to all device in the PTT group call.

Method 500 continues in block 570 with PTT server 105 causing the third communication from the first user device 120 and the fourth communication of the second user device 125 to be provided to all user devices in the group of user devices 140 and to all console devices in the group of console devices 170.

In the embodiment shown in FIG. 5, the third communication from the first user device 120 and the fourth communication of the second user device 125 will be provided to all user devices 140 and all console devices 170 in the PTT group call. In one embodiment, the third communication from the first user device 120 and the fourth communication of the second user device 125 may be sent individually to a receiving user device or console device, which may be useful in systems that use end-to-end encryption of communication content so that the third communication and the fourth communication can be decrypted separately. Further, this embodiment allows the receiving user device or console device to separate the received communications so that, for example, the third communication from the first user device 120 can be played at a higher volume than the fourth communication of the second user device 125.

In another embodiment, the third communication from the first user device 120 and the fourth communication of the second user device may be mixed at the PTT server 105. The third communication from the first user device 120 and the fourth communication of the second user device 125 are combined into a single audio or video stream, also referred to as a mixed signal. The mixed signal may be provided to all user devices in the group of user devices 140 and to all console devices in the group of console devices 170, which may enable the third communication from the first user device 120 and the fourth communication of the second user device 125 to be sent to all devices in the PTT group call using less bandwidth than the sum total of sending the communications individually.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, the term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A push-to-talk server for handling multiple emergency alerts in a push-to-talk group, wherein the push-to-talk group includes a plurality of user devices and a plurality of console devices in a push-to-talk group, the push-to-talk server comprising:

a memory storing instructions for execution by a processor;

a processor coupled to the memory, the processor configured to:

receive a first emergency alert from a first user device in the push-to-talk group;

receive a second emergency alert from a second user device in the push-to-talk group;

cause the first emergency alert and second emergency alert to be provided to each of the console devices;

receive, from the first user device, a first communication;

receive, from the second user device, a second communication;

cause the first communication and the second communication to be provided to each of the console devices in the push-to-talk group;

receive, from a first console device, a selection of one of the first user device and the first emergency alert; and, in response:

subsequently selectively route a third communication from the first user device to the first console device and not to a second console device in the push-to-talk group.

2. The push-to-talk server of claim 1, wherein the processor is further configured to:

receive, from the first console device, a determination that the third communication from the first user device should be provided to all user devices and all console devices in the push-to-talk group; and, in response to said determination:

cause the third communication from the first user device to be provided to all user devices and all console devices in the push-to-talk group.

3. The push-to-talk server of claim 1, wherein the processor is further configured to:

receive, from the first console device, a determination that the third communication from the first user device should not be provided to all user devices and all console devices in the push-to-talk group; and, in response to said determination:

receive, from the first console device, a response to the first user; and cause the response to be provided to the first user.

4. The push-to-talk server of claim 1, wherein the processor is further configured to:

receive, from the first console device, a selection of one of the second user device and the second emergency alert; and, in response:

subsequently selectively route a fourth communication from the second user device to the first console device and not to the second console device in the push-to-talk group.

5. The push-to-talk server of claim 1, wherein the processor is further configured to:

receive, from the second console device of the plurality of console devices, a selection of one of the second user device and the second emergency alert; and, in response:

subsequently selectively route a fourth communication from the second user device to the second console device and not to the first console device in the push-to-talk group.

6. The push-to-talk server of claim 5, wherein the processor is further configured to:

receive, from the second console device, a determination that the fourth communication from the second user device should not be provided to all user devices and all console devices in the push-to-talk group; and, in response to said determination:

receive, from the second console device, a response to the second user; and cause the response to be provided to the second user.

7. The push-to-talk server of claim 5, wherein the processor is further configured to:

receive, from the first console device, a determination that the third communication from the first user device should be provided to all user devices and all console devices in the push-to-talk group;

receive, from the second console device, a determination that the fourth communication from the second user device should be provided to all user devices and all console devices in the push-to-talk group; and, in response to said determination:

cause the third communication from the first user device and the fourth communication from the second user device to be provided to all user devices and all console devices in the push-to-talk group.

8. The push-to-talk server of claim 1, wherein the first emergency alert is an indication that first user device is in an emergency mode and the second emergency alert is an indication that the second user device is in an emergency mode.

9. The push-to-talk server of claim 1, wherein the first communication and the second communication include audio, video, or a combination of audio and video.

10. The push-to-talk server of claim 1, wherein the first communication and the second communication include data.

11. A method for handling multiple emergency alerts in a push-to-talk group, wherein the push-to-talk group includes a plurality of user devices and a plurality of console devices in a push-to-talk group, the method comprising:

receiving a first emergency alert from a first user device in the push-to-talk group;

receiving a second emergency alert from a second user device in the push-to-talk group;

causing the first emergency alert and second emergency alert to be provided to each of the console devices in the push-to-talk group;

receiving, from the first user device, a first communication;

receiving, from the second user device, a second communication;

causing the first communication and the second communication to each of the console devices in the push-to-talk group;

receiving, from a first console device, a selection of one of the first user device and the first emergency alert; and, in response:

subsequently selectively routing a third communication from the first user device to the first console device and not to a second console device in the push-to-talk group.

12. The method of claim 11, further comprising:

receiving, from the first console device, a determination that the third communication from the first user device should be provided to all user devices and all console devices in the push-to-talk group; and, in response to said determination:

causing the third communication from the first user device to be provided to all user devices and all console devices in the push-to-talk group.

13. The method of claim 11, further comprising:
receiving, from the first console device, a determination that the third communication from the first user device should not be provided to all user devices and all console devices in the push-to-talk group; and, in response to said determination:
receiving, from the first console device, a response to the first user; and
causing the response to be provided to the first user.

14. The method of claim 11, further comprising:
receiving, from the first console device, a selection of one of the second user device and the second emergency alert; and, in response:
subsequently selectively routing a fourth communication from the second user device to the first console device and not to the second console device in the push-to-talk group.

15. The method of claim 11, further comprising:
receiving, from the second console device of the plurality of console devices, a selection of one of the second user device and the second emergency alert; and, in response:
subsequently selectively routing a fourth communication from the second user device to the second console device and not to the first console device in the push-to-talk group.

16. The method of claim 15, further comprising:
receiving, from the second console device, a determination that the fourth communication from the second user device should not be provided to all user devices and all console devices in the push-to-talk group; and, in response to said determination:
receiving, from the second console device, a response to the second user; and
causing the response to be provided to the second user.

17. The method of claim 15, further comprising:
receiving, from the first console device, a determination that the third communication from the first user device should be provided to all user devices and all console devices in the push-to-talk group;
receiving from the second console device, a determination that the fourth communication from the second user device should be provided to all user devices and all console devices in the push-to-talk group; and, in response to said determination:
causing the third communication from the first user device and the fourth communication from the second user device to be provided to all user devices and all console devices in the push-to-talk group.

18. The method of claim 11, wherein the first emergency alert is an indication that first user device is in an emergency mode and the second emergency alert is an indication that the second user device is in an emergency mode.

19. The method of claim 11, wherein the first communication and the second communication include audio, video, or a combination of audio and video.

20. The method of claim 11, wherein the first communication and the second communication include data.

* * * * *